Figure 14:
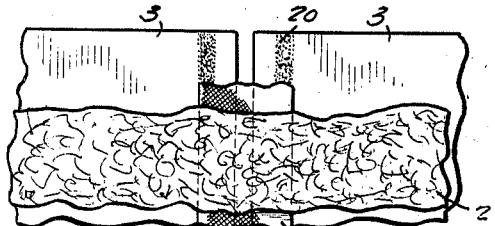

April 20, 1937. A. C. BENEDICT 2,078,049
NONCRACKING JOINT COVERING AND FINISH
Filed July 9, 1936 2 Sheets-Sheet 1
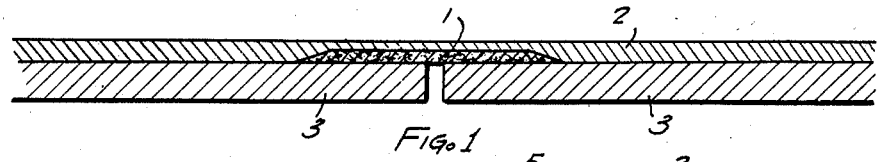
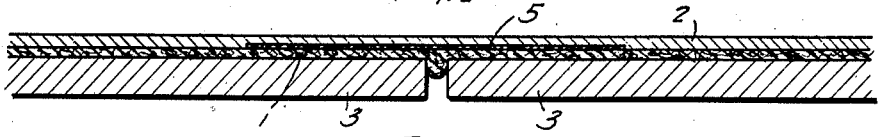
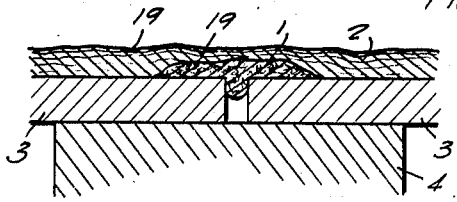
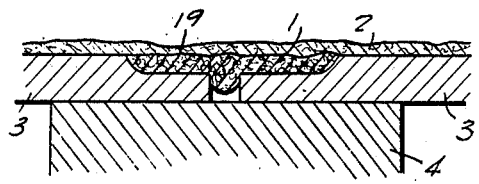
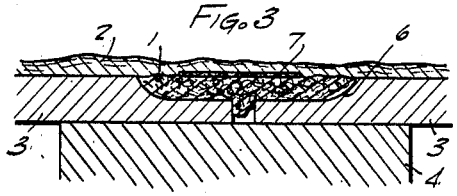
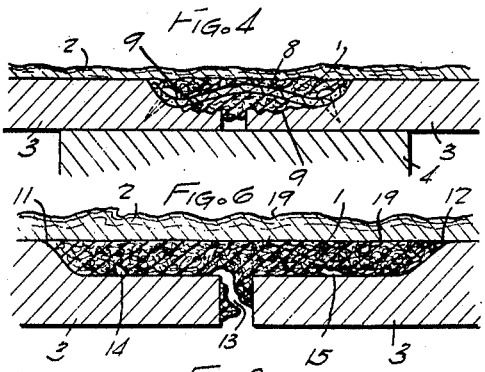
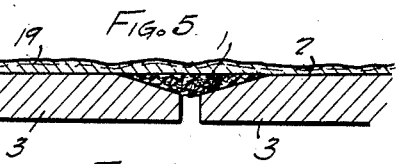
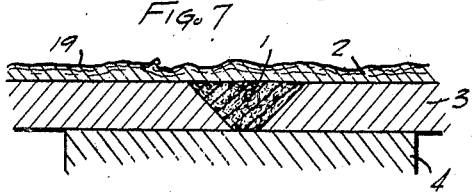
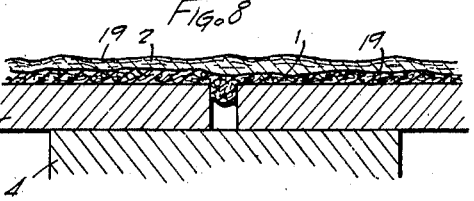
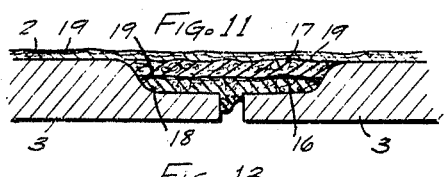
Inventor
ANTHONY C. BENEDICT
By Joshua E. Hotts
Attorney April 20, 1937.  A. C. BENEDICT  2,078,049

NONCRACKING JOINT COVERING AND FINISH

Filed July 9, 1936   2 Sheets-Sheet 2

Inventor
ANTHONY C. BENEDICT
By Joshua R. H. Potts
Attorney

Patented Apr. 20, 1937

2,078,049

UNITED STATES PATENT OFFICE 2,078,049

NONCRACKING JOINT COVERING AND FINISH

Anthony C. Benedict, Rockville Centre, N. Y.

Application July 9, 1936, Serial No. 89,719

30 Claims. (Cl. 72—16)

This invention has to do with the building arts, and is concerned primarily with those structural parts which include, as characteristic elements, boards, slabs or panels which constitute the main body of the wall, ceiling or other structural element, and which are covered by a finishing material to present a continuous, unbroken, finished surface over the joints, gaps or cracks of these elements.

It has been found that the better practice in building such structural parts, as walls, from panels, as above noted, requires that provision be made for a certain amount of displacement between the adjacent panel edges. Such displacement may be caused by various conditions, such as temperature changes, moisture changes, drying out of the building material, or stresses set up on the boards or panels, incident to the building construction or use. This is often done by leaving space between adjacent panels.

When a finishing material of the type now available to the public, such as ordinary plaster composition, paint, or other coating is employed over a plurality of panels, a distortion of any character between the adjacent panels is usually accompanied by a breaking or cracking in the finished surface, due to its inability to meet the movements of the panels, with respect to others.

When plastic putties, which remain soft, and without appreciable porosity and elasticity, are used to cover up and fill joints, the putties tend to change shape, and bulge or become depressed at the joint so as to mar the appearance of the finished surface.

With the foregoing conditions in mind, this invention has in view, as its foremost object, the provision of a finish designed for structural purposes, and which is intended to be applied over adjacent edges and surfaces of adjacent panels, so as to permit of relative displacement of the panels, and, at the same time, present an unbroken, finished surface on the finishing material which is applied to the panels.

In carrying out this objective in a practical embodiment, the invention proposes the use of a surface coating of peculiarly adaptable characteristics over a plurality of panels, and the use of means for separating the coating from the panels at portions adjacent the adjacent edges of said panels. The characteristics of the surface coating which are peculiarly adaptable to such use are elasticity, flexibility, physical stability and lack of tackiness at even extreme climatic temperatures. The under body, or means for separating the coating, or outer body, from the edge portions of adjacent panels may take various forms, but the underlying common feature of them is that they prevent displacement forces from concentrating rupturing influences on the surfaces of the coating, at the restricted area where adjacent panels are joined. This is accomplished by arranging the panels, separating means, and outer coating so that the edges of the panels can move in relation to each other and the surface coating.

Various other more detailed objects and advantages will in part become more apparent, and in part be hereinafter stated as the description of the invention proceeds.

The invention, therefore, comprises a surface coating of peculiarly adaptable characteristics for covering a plurality of panels, and means interposed between portions of the panels and the coating for separating movably the panels and the coating, so as to prevent displacing forces acting upon the panels from concentrating rupturing influences on the surface coating at the restricted area where adjacent panels are joined.

Figure 15:
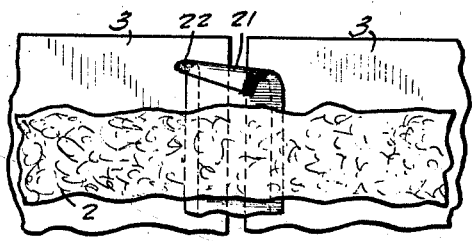
Figure 16:
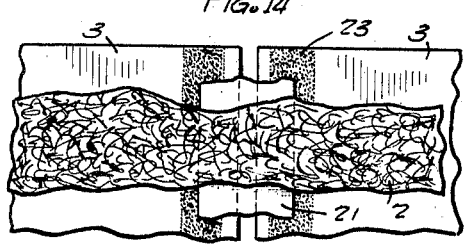
Figure 17:
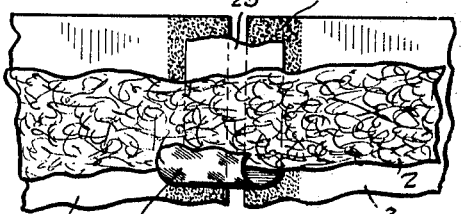
Figure 18:
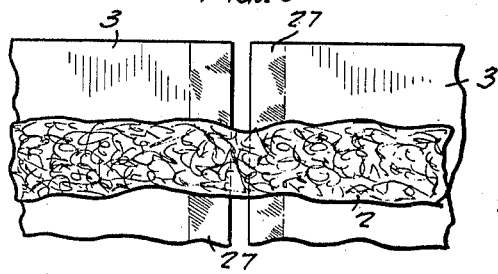
Figure 19:
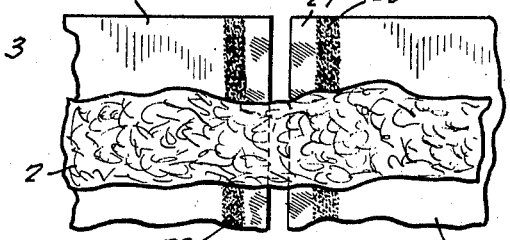
Figure 20:
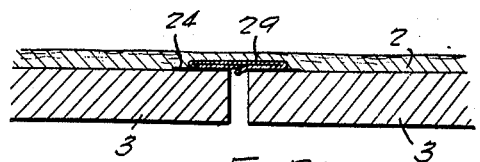
Figure 21:
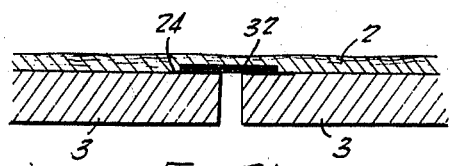
Figure 23:
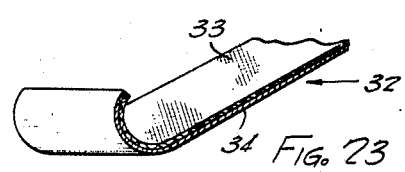
Figure 22:
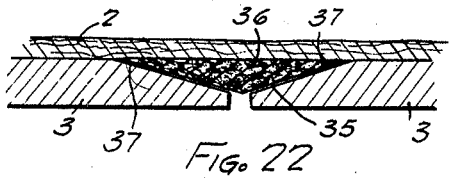
Figure 24:
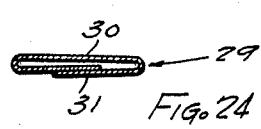

For a full and more complete understanding of the invention, reference may be had to the following description and accompanying drawings, wherein:

Figure 1 is a sectional view bringing out an elementary form of the invention, in which an under body is placed over the adjacent edges of panels, and is covered by a continuous outer body, Figure 2 is a showing somewhat similar to Figure 1, bringing out a different arrangement in which the under body is continuous over the panels, and a reinforcing means is employed between the under and outer bodies at the joint, Figure 3 is another sectional view showing an arrangement in which a substantially thick outer body is employed in conjunction with the under body which extends between the spaced edges, Figure 4 is an illustration somewhat similar to Figure 3, showing the boards as recessed to receive the under body, Figure 5 is a view along the lines of Figure 4, showing the arrangement when a reinforcing means is interposed between the under body and outer body, Figure 6 is much the same as Figure 5, but brings out a slightly modified form in which the recesses in the boards are corrugated to strengthen the bond with the under body, Figure 7 develops a joint somewhat similar to Figure 1, but in which the corners of the boards are beveled to accommodate the under body, Figure 8 is an enlarged detailed showing, bringing out the condition of the under body when a fracture has been developed therein, and which fracture is not accompanied by any breaking or cracking in the outer body, Figure 9 is an illustration of the manner of having the under body extend through the space between the edges of the boards, and which boards have been beveled to accommodate the under body, Figure 10 brings out an arrangement in which the under body is substantially continuous and extends partially into the space between the board edges, Figure 11 is a detailed showing of an under body which has ben preformed, Figure 12 is a view similar to Figure 11, showing a somewhat modified form of under body, Figure 13 brings out an arrangement in which the under body takes the form of a plurality of layers, Figure 14 is a plan view, with the finishing material broken away, bringing out a somewhat modified form, in which a strip of material is placed over the joint adjacent to the edges of the board between the coating and the boards, Figure 15 is a view somewhat similar to Figure 14, in which adhesive material is carried by the strip rather than the boards, Figure 16 is a similar elevational showing in which the adhesive on the boards is extended beyond the edges of the strip to effect a better bond at this point between the finishing material and the boards, Figure 17 is a view similar to Figure 16, in which the under surface of the strip has been treated to prevent its adherence to the adhesive, Figure 18 brings out an arrangement in which the edges of the boards have been treated so as to prevent adherence of the finishing material to the boards adjacent to the edges, Figure 19 is a view similar to Figure 18, but in which adhesive is placed along the edges of the portions which have been treated to prevent adherence, Figure 20 is a sectional view bringing out a variation of the form shown in Figure 17; in this view the strip is made of a laminated construction, and the layers of each are movable with respect to each other, Figure 21 is another modification of the form of the invention shown in Figure 17; in this view the reinforcing strip is of a two-ply construction, the layers of which are held together by a comparatively weak adhesive, Figure 22 shows an arrangement in which the edges of the boards have been beveled to provide a recess for receiving a preformed strip; adhesive is employed along areas which are spaced from the edges of the boards, Figure 23 is an enlarged detailed view in perspective of the strip which is shown in Figure 21, and Figure 24 is and enlarged detailed view in cross-section of the strip which is brought out in the joint of Figure 20.

This application is a continuation in part of the copending application filed by me on March 24, 1934, for "Non-cracking joint covering and finish", and bearing Serial No. 717,237.

Referring now to the drawings, wherein like reference characters denote corresponding parts, there is shown throughout the several figures of the drawings a pair of panels 3, which may be of any suitable composition.

In Figure 1, a so-called under body or separating means is designated 1, and shown as secured to panels 3, adjacent the edges thereof. It is important that this under body 1 be of sufficient dimensions, and have the properties of porosity, compressibility, stretchability and flexibility to a comparatively great degree, when relatively great movements between the edges of the boards 3, and between these edges and the outer coating or outer body, are anticipated.

An outer body or coating, which is a plastic composition, is shown at 2 as covering and adhering to the boards at areas removed from their edges. The under body 1 or separating means is placed over the joint itself and back an appreciable distance from the edges of the boards and secured to the edge portions of said boards. The outer body 2 presents a finished surface, which is intended to remain whole and unmarred by any relative displacement of the boards 3 and distortion of the under body 1.

Where the under body described in connection with Figure 1 is employed, the outer body 2 need not be of as porous and flexible a structure as the under body 1, for stresses caused by relative displacement between the edges of the boards will be taken up more directly by the under body, distributed over a wider area throughout the outer body 2, and be prevented from concentrating rupturing influences at the area where the panels or boards are joined. However, the outer body should be relatively firm and free from tackiness.

The outer body is susceptible of being applied in various thicknesses, as required, to eliminate completely any showing of the joints between the panels in the finished surface, and to increase strength and density. Under actual applying conditions, it has been found that the outer body, of proper characteristics, will, preferably, attain a thickness of $\frac{1}{32}''$ or more at the joint. It can support itself across a fair-sized gap or loose area. Also, the outer body may be thicker, when required, such as $\frac{1}{4}''$ or more.

Likewise, the dimensions of the under body may vary, in accordance with the stresses and strains which ordinarily may be expected at the particular joint in which it is used. Ordinarily, when secured to the immediate edges of the boards, the under body will attain a thickness of $\frac{1}{32}''$ or more, such as $\frac{1}{4}''$ or more, but when it is left loose some distance from the board edges, it is noted that this dimension is not critical, and may be less when circumstances permit; the ordinary rule is that the greater the anticipated displacements of the panels, the greater should be the thickness of the under body, but this is, of course, affected by the width of the under body, and the area over which there is no secure bond between the outer body and the edges of the panels.

It is important to note that the width along the edges of the boards which are covered by the under body may also vary, commensurate with the degree of anticipated displacement of the panels. When the displacements are comparatively small, the under body need be carried back only a slight distance from the edges of the panels; but where the expected displacements are greater, the under body or separating means should be carried a correspondingly greater distance from the edges of the panels. Ordinarily, a strip, ranging from $\frac{1}{2}''$ to $1''$ in width, along each board edge, will be covered by the under body or separating means.

The under body 1 may take the form of a composition which may be applied in plastic form by a trowel, or it may be preformed of porous material, such as cork, felt or the like, as indicated by the showings of Figures 11 and 12. For a relatively thick under body or separating means in plastic form, I preferably employ a base of divided solid material having resilient or flexible characteristics, as for example, comminuted cork and fibrous asbestos combined with a liquid binder, preferably, an elastic varnish including, by volume, about 50% of volatile solvent, principally benzine.

In preparing the relatively thick under body, which is to be applied in its plastic state, the base, as above noted, should be mixed with a liquid or paste binder to which may be added a proper amount of volatile liquid. By varying the amount and composition of the binder, the properties of strength, porosity, flexibility, adhesiveness, and elasticity, may be controlled fairly accurately, and made to suit the particular conditions of service. An elastic oleoresinous varnish, or varnish-like material, is a preferred type of binder, because it dries satisfactorily, and can be made to provide the properties of stability, strength, elasticity, durability, and adhesiveness, to the required extent. It may be made with China-wood oil, a resin, or resinoid, a lead drier, and a volatile liquid.

The elasticity of the binder may be reduced when the base largely comprises elastic particles, such as cork, and yet, not affect, deleteriously, the ultimately desired elasticity.

My preferred formula for a relatively thick plastic under body, because of strength and economy, is:

| | Parts |
|---|---|
| Base material, by net volume | 20 |
| Liquid binder, by volume | 22 |
| Added volatile liquid solvent | 51 |
| Added volatile emulsion liquid | 7 |

My preferred base material, when strength and relatively great flexibility and porosity are desired, comprises as follows:

| | Parts |
|---|---|
| Comminuted cork, net volume, (this cork may vary in size from 10 mesh to dust) | 45 |
| Fibrous asbestos, net volume | 24 |
| Vegetable fibre | 22 |
| (Sisal fibre may be used, ranging in size from $\frac{1}{16}''$ to $\frac{1}{4}''$) | |
| Fine mineral pigment, net volume | 6 |

By way of explanation, it is noted that the net volume referred to above is taken as equal to the volume of kerosene oil which is displaced by the base material when mixed with a large excess of the oil, allowed to stand one hour, and then agitated so as to remove air bubbles, all at atmospheric pressure.

Another example of a relatively thick under body which may be employed, and in which the proportions vary considerably from those above, is set forth as follows; this is intended to provide a body of greater porosity and compressibility, but less strength:

| | Parts |
|---|---|
| Base material, by net volume | 25 |
| Liquid binder, by volume | 10 |
| Added volatile solvent liquid, by net volume | 65 |

In this composition, the emulsifying agent has been omitted, and it has also been found that the volatile liquid solvent may be omitted, in which event the composition for the under body may be made up as follows:

| | Parts |
|---|---|
| Base material, by net volume | 50 |
| Liquid binder, by net volume | 50 |

The cohesive strength of the under body is dependent, more or less directly, on the proportion of the fibrous or hairy particles which are present therein. When the strength is to be greater, these should be present in substantial amounts, and a fair proportion of the fibres should attain a length ranging from $\frac{1}{32}''$ to $\frac{1}{8}''$, or greater.

Another example for a base material may consist of:

| | Parts |
|---|---|
| Comminuted cork, net volume, (ranging in size from 22 mesh to dust) | 85 |
| Fibrous material, net volume, (asbestos) | 15 |

Yet another example of a base material is:

| | Parts |
|---|---|
| Fibrous asbestos, net volume | 50 |
| Woody fibres or hairy material, net volume | 50 |

When the base material used contains a fairly large proportion of large particle material, such as cork, which is inherently porous in nature, it is desirable to use a large proportion of the binder, in which event the composition for the under body may take the following form:

| | Parts |
|---|---|
| Comminuted cork, net volume | 30 |
| Fibrous material, net volume | 3 |
| Liquid binder, net volume | 67 |

Where a relatively thick under body, as before described, is employed, the outer body should be more dense than the under body, and especially at the surface of the outer body. The outer body is preferably made by using a base material of inert mineral such as silica, or other suitable solid matter, combined with a substantial amount of fibrous or hairy material, as for instance, asbestos fibre of appreciable length. This base material is mixed with a liquid binding material, which is flexible after drying. A liquid volatile agent, such as mineral spirits, may also be added to thin the mass to a suitable consistency for application by appropriate tools, such as a trowel or brush.

One example of a composition of an outer body which may be employed, is set forth as follows, and it is noted that the proportion of the materials is given by weight:

| | | |
|---|---|---|
| Fibrous asbestos | lbs | 3 |
| Ground mineral | lb | 1 |
| Elastic varnish | fl. oz | 45 |
| Mineral spirit | fl. oz | 60 |

Another example of an outer body of a somewhat heavier consistency, which will usually be applied in a relatively thick coating at a single application, is as follows:

| | | |
|---|---|---|
| Fibrous asbestos | lbs | 3 |
| Coarse and fine ground mineral | lbs | 10 |
| Elastic varnish | fl. oz | 25 |
| Benzine | fl. oz | 36 |
| Toluol | fl. oz | 6 |

While the above noted compositions are set forth as typical ones which may be employed in the make-up of the outer body, it is to be clearly understood that the invention is not to be limited in this particular respect, as the proportions of the ingredients may vary, and other materials having the required properties for various services may be substituted for the ingredients listed, an essential requirement being, however, that the body is well reinforced with fibrous, hairy, or elongated particles, and is properly held together with a flexible stable binder. Cork, because of its elasticity, may be used instead of ground mineral, and then a less elastic binder may be employed. When desired, the ground mineral may also include an appropriate pigment for imparting a desired color.

At this point, it is well to note that at the surface of the under body, which is applied in a plastic state, as well as at the surface of the outer body, a skin or relatively dense portion forms on drying, in those cases where a volatile liquid solvent is used, the formation of the skin being directly dependent upon the evaporating action of the volatile solvent. The presence of this skin is a desirable attribute as it contributes strength, toughness, imperviousness, waterproofness, and other desirable characteristics, and, of course, its thickness is greater when the plastic is applied in a thick coating.

Preferably, in cases when a preformed under body is employed, an adhesive is placed adjacent the edges of the panels to form a bond therewith. When a plastic under body of considerable thickness is used, an auxiliary adhesive may be applied to the panels to strengthen the bond between the panels and under body.

At this point it is important to note that there is an important relationship between the adhesive which is used and the liquid in the plastic body which is applied to the adhesive. If the liquid has the ability of acting as a solvent for the adhesive, the bond provided by the latter is materially depreciated, due to the fact that the adhesive is dissolved and dissipated upon evaporation of the volatile solvent, as the latter dries out and tends to draw the adhesive upward away from the panels.

To obtain the strongest bond, the adhesive which is employed is of such a material as to not be soluble in the liquid of the plastic. For instance, when the binders are of the composition hereinbefore set forth, a casein glue will be utilized, as, for instance, when the vehicle binder is of an oleoresinous mineral spirits composition. Preferably, the material of the body will be applied over the adhesive coating before the latter has dried or lost its soft consistency, so as to provide a good adhesion and strong bond with the boards. It is well to note that the application of the coating over the adhesive before the latter has completely dried, does not prevent the drying or setting action of the adhesive to be fully carried out to form a proper bond.

While casein glue has been described as the preferred material for use as the adhesive, it is obvious that other materials having the ability to remain insoluble in the binder might be employed, and it is the relationship between the volatile binder and the adhesive which is important.

Referring now to Figure 2, attention is called to the fact that the under body 1 is shown as partially entering the space between the edges of the boards 3. Also, a thin membrane or mesh is indicated at 5 as reinforcing the outer body 2 and under body 1 over the joint, and for a considerable distance on each side thereof. This strip 5 may consist of any suitable fabric, membrane, or mesh, and will usually be applied to the under body 1 prior to the application of the outer body 2. This strip 5 functions to materially assist in the distribution of the strains caused by relative displacement of the boards 3 over a wider area in the body 2.

Referring now more particularly to Figure 3, the wall boards 3 are shown as attached to building supports, such as studding 4, to which they are usually affixed, as by nailing. In this view, the under body 1 is shown as partially entering the space between the edges of the boards 3, and while the under body 1 only extends a comparatively short distance back over the edges of the boards on each side of the joint, the under body is of a comparatively greater thickness. This view clearly brings out the formation of the skin 19 which is formed on the under body incident to drying thereof.

A similar outer layer or skin 19, of greater density and strength, is also formed on the surface of the outer body 2.

In Figure 4, there is shown an arrangement in which the boards 3 have been recessed to accommodate the under body 1, in such a manner as to provide for the outer surface of the under body to lie substantially flush with the surface of the boards 3.

Referring now more particularly to Figure 5, an arrangement somewhat similar to Figure 4 is developed, in which the edges of the boards 3 have been cut away to provide a recess 6 which accommodates the under body 1 in the manner above noted. Also, a strip 7 of fabric, or other suitable material, is shown as separating the outer body 2 from the under body 1 over the joint and for a slight distance on each side thereof. This strip 7 also serves as a reinforcement for supporting the outer body in position over the joint and distributing strains.

As shown in Figure 6, a reinforcing strip may take the form indicated at 8, in which it is embedded in the under body 1, and attached by tacks or the like to the panels. Also, to provide a more thorough bond or interlock with the boards 3, the surface of the recess 6 may be corrugated, as indicated at 9. Naturally, the material of the under body 1 will be received in these corrugations to set up a good interlock.

Figure 7 develops a slightly different arrangement in which the edges of the boards 3 are beveled so as to provide a recess which receives the preformed under body 1, and presents the surface thereof in a plane substantially flush with the surfaces of the boards 3.

Referring now more particularly to Figure 8, a joint is shown in which a comparatively wide recess has been formed in the boards 3 for receiving the under body 1. The edges of the recess on each side of the joint are indicated at 11 and 12, and it is noted that the strains developed upon any relative displacement of the boards 3 is distributed back to these edges, the entire extent of the outer body 2 between the edges 11 and 12 receiving the strains. In this view, the under body 1 is shown as being fractured at 13 by relative displacement of the boards 3 which, in this instance, is shown as being somewhat vertical in nature. Also, there are shown at 14 and 15 certain breaks which have occurred in the bond between the under body 1 and the surfaces of the boards 3 with which they engage.

In Figure 9, a somewhat different arrangement of the joint is shown, in which the edges of the boards 3 have been beveled across their entire thickness and the under body 1 entirely fills the space between the edges of the boards 3 and rests on the support 4. With this arrangement, the upper surface of the under body should lie substantially flush with the boards 3 over which the outer body 2 is applied.

Figure 10 develops an arrangement somewhat similar to Figure 2 in which the under body 1 extends entirely over the surface of the boards 3 and partially enters the space between the boards 3.

In Figure 11, an under body 10 is shown which depicts the manner in which this body may be preformed prior to application to the joint. In this view, it is noted that the edges of the under body are beveled.

Figure 12 develops a more simple construction of the preformed under body 10 in which the beveling of the edges has been omitted.

Referring now more particularly to Figure 13, another type of joint is shown in which the under body is made up of a plurality of layers. In this view, the under body comprises a lower layer 16 and an upper layer 17, the lower layer 16 being located in the bottom of the recess 18 which is formed in the boards, while the upper layer 17 occupies the upper portion of the recess. It is noted that the skin 19 which will be formed on the lower layer 16 in the manner above described clearly identifies the layered construction of the under body, when applied in this manner.

In the various joints above described, it is noted that the under body or separating means 1 is present in one form or another. However, where displacements are relatively small, good results may be had by using a separating means of thinner dimensions, as long as adhesion between the outer coating and the boards along and adjacent to the adjacent edges thereof is prevented. By such an arrangement a concentration of rupturing influences at the restricted area between the panels is prevented from damaging the outer body or coating.

Referring now more particularly to Figure 14, it is noted that the boards 3 are provided with a coating of adhesive 20 which is applied in strips which are spaced an appreciable distance from the edges of the boards 3. A strip 21 of paper of suitable toughness, or other appropriate material, is now applied over the joint and the edges of this strip 21 are anchored to the boards 3 by the adhesive 20. However, it is noted that along the edges of the boards 3 and for an appreciable distance back therefrom on each side of the joint, the strip 21 is not affixed in any manner to the boards 3 and is, therefore, free to move with respect thereto.

Upon application of the coating or outer body 2 over the boards 3, it is evident that this coating is prevented from adhering to the boards 3 along and adjacent to the edges thereof by the strip 21. Upon relative lateral displacement of the edges of the boards 3, the strains and stresses caused thereby will be distributed over the area to which outer body 2 is not rigidly held.

A slightly different arrangement is shown in Figure 15, in which the strip 21 is shown as being provided with an adhesive 22 along its edges. This adhesive causes the strip to be affixed to the boards 3 in the manner noted in connection with Figure 14, and functions in the same manner to distribute the stresses caused by relative displacement of the boards 3 over the area defined by the strip 21 which is free from the boards 3.

In Figure 16, there is developed a somewhat improved type of joint in which adhesive material is applied in relatively wide strips, as indicated at 23 on the boards 3 on each side of the joint. These strips or bands 23 of the adhesive are spaced from the edges of the boards, as shown in the drawings. The strip 21 is now applied and is anchored to the boards by the adhesive 23. However, it is important to note that the strip 21 is of such breadth as to not completely cover the bands of adhesive 23. When the coating or outer body 2 is applied over the boards 3 and strip 21, this outer coating will be more firmly anchored to the boards 3 over the areas at which it engages the adhesive 23. As has been repeatedly pointed out, the stresses caused by relative displacement of the boards 3 are distributed over the area to which outer body 2 is not rigidly held, and the fact that the coating 2 is more firmly anchored to the boards 3 adjacent to the strip 21 presents certain beneficial results in preventing coating 2 from tearing loose from panels 3. As before pointed out, the adhesive will preferably not be soluble in the liquid of the plastic coating 2.

In Figure 17 there is shown an arrangement in which the bands of adhesive are extended clear to the edges of the boards 3. In this view, the bands of adhesive are identified by the reference character 24. When this arrangement is employed, a somewhat different form of adhesion preventative strip is employed. A strip 25 is shown as having its under surface treated to prevent strong adhesion to these adhesive bands 24; thus, comparatively weak strains will free the strip 25 from the boards and prevent the concentration of forces on the outer coating at the joint between the panels. This under surface may be treated by any appropriate material having the desired effect of preventing strong adhesion and wax is mentioned as one material which has been found as effective for this purpose. The waxed surface of the strip 25 is indicated at 26.

Figure 18 develops a somewhat more simplified form of joint in which the coating 2 is prevented from adhering to the boards 3 along and adjacent to the edges thereof due to the fact that these areas of the boards have been treated so as to prevent the adhesion of the coating thereto. Coating 2 should be of a thickness and character to be self-supporting at the loose part. Again it is noted that any material effective for this purpose may be used, and the reference character 27 is intended to denote the areas which have been waxed to prevent the adhesion of the coating to the boards. It is evident that relative movement between the edges of the boards 3 is permitted and the stresses thereof indirectly transmitted to the coating 2 so that these stresses caused by this relative displacement will be distributed over the area defined by the treated bands 27.

Figure 19 presents a joint which is quite similar to that shown in Figure 18, with the exception that a more firm bond or anchorage of the coating 2 to the boards 3 is provided along and adjacent to the edges of the treated areas 27 by the bands of adhesive shown at 28.

Referring now more particularly to Figure 24, a strip of material is referred to by the reference character 29 and is shown as comprising an upper layer 30 and a lower layer 31 and it is noted that the layers 30 and 31 are free to move with respect to each other.

Referring now to Figure 20, a joint is shown in which the strip 29 is used. In this type of finish, bands of adhesive 24 are provided along and adjacent to the edges of the boards 3 for an appreciable extent. The strip 29 is now applied over the joint so that the lower layer 31 is firmly anchored thereto by the adhesive bands 24. However, this strip 29 is not sufficiently wide to completely cover the adhesive bands 24. The coating or outer body 2 is now applied over the boards 3 and upper layer 30 of the strip 29 and adheres to these surfaces. The distribution of stresses which may be caused by relative displacement of the boards 3 over the area defined by the strip 29 is provided for by the relative movement permitted between the layers 30 and 31 of the strip 29, and, consequently, between coating 2 and panels 3 at and adjacent the joints.

In Figure 23, a reinforcing strip is shown and referred to generally by the reference character 32. This strip is made up of an upper layer 33 of fabric, and a bottom layer 34 of paper, the two layers being held together by an adhesive of a relatively weak nature. This strip 32 is shown as used in the joint in Figure 21. In this view, the adhesive bands 24 are present along and adjacent to the edges of the boards 3, and the strip 32 is of appropriate width to leave certain portions of the band 24 uncovered so as to provide for a firm anchorage of the coating or outer body 2 to the boards along these uncovered areas of the adhesive bands 24.

The outer coating 2 adheres firmly to the fabric 33 while the under layer 34 adheres to the boards 3. However, upon relative displacement of the boards 2, the weak bond between the layers 33 and 34 permits of relative movement between these parts, so that the stresses caused by the displacement are distributed over the area defined by the strip 32.

Referring now to Figure 22, the edges of the boards 3 are shown as beveled, as indicated at 35, to provide a recess for receiving a relatively thick under body or separating means 36, which may be of porous flexible material, as hereinbefore described. Along and adjacent to the edges of the bevels 35 which are remote from the free edges of the boards 3, bands of adhesive are applied, as indicated at 37. When the strip 36 is placed in the recess defined by the bevels 35, this material will adhere strongly to the boards 3 along the adhesive bands 37, but will not adhere to the boards 3 along the surfaces of the bevels 35 which are not treated by adhesive, hence, causing the distribution of the stresses set up by lateral displacement of the boards 3; concentration of rupturing influences on coating 2 will thus be prevented, not only by the looseness of the under body, but also by the structural character of the under body, which permits it to stretch, compress, and flex between the area where it is attached to the boards and the outer body, as well as where it is free from the boards.

While preferred specific embodiments of the invention are hereinbefore set forth, it is to be clearly understood that I am not to be limited to the exact constructions illustrated and described, because various modifications of these details may be provided in putting the invention into practice, within the purview of the appended claims.

I claim:—

1. A finish comprising the combination of a porous under body applied in the form of a plastic on and bonded to a structural surface and attaining $\frac{3}{32}''$ or more in thickness and an outer body applied as a coating over and bonded to the under body, the under body having when dry a porous structure of pronounced flexibility for absorbing strains, the outer body comprising divided solids including fibrous material and flexible binding material of the character of elastic varnish.

2. The combination of units of building material having a joint therebetween to which is applied a finish which covers the joint, the said finish comprising the combination of a porous under body applied in the form of a plastic on and bonded to a structural surface and attaining $\frac{3}{32}''$ or more in thickness and an outer body applied as a coating over and bonded to the under body, the under body having when dry a porous structure of pronounced flexibility for absorbing strains, the outer body comprising divided solids including fibrous material and flexible binding material of the character of elastic varnish.

3. A finish comprising the combination of a porous under body applied in the form of a plastic on and bonded to a structural surface and attaining $\frac{3}{32}''$ or more in thickness and an outer body applied as a coating over and bonded to the under body, the under body having when dry a porous structure of pronounced flexibility for absorbing strains, the outer body attaining a thickness of $\frac{3}{32}''$ or more as applied and comprising divided solids including fibrous material and flexible binding material of the character of elastic varnish.

4. A finish on building board construction and the like and over joints therein, comprising a substantially porous under body and a denser outer body in combination therewith, the under body bonded to said panels at either side of and spanning a joint, the outer body covering the joint and over the under body, the under body based on particles of solid matter held flexibly together by means inherent in the under body and having properties of stretch and elasticity in substantial degree, the outer body being a composition applied as a plastic coating and comprising finely divided solid matter with a flexible binder which comprises elastic adhesive material having pronounced physical stability under all usual climatic temperatures.

5. A finish on building board construction and the like and over joints therein, comprising a substantially porous under body having a thickness of $\frac{1}{16}''$ or more and a denser outer body in combination therewith, the under body bonded to said panels at either side of and spanning a joint, the outer body covering the joint and over the under body, the under body based on particles of solid matter held flexibly together by means inherent in the under body and having properties of stretch and elasticity in substantial degree, the outer body being a composition applied as a plastic coating and comprising finely divided solid mater with a flexible binder which comprises elastic adhesive material having pronounced physical stability under all usual climatic temperatures.

6. A finish on building board construction and the like and over joints therein, comprising a substantially porous under body and a denser outer body in combination therewith, the said under and outer bodies jointly attaining a thickness of $\frac{1}{16}''$ or more, the under body bonded to said panels at either side of and spanning a joint, the outer body covering the joint and over the under body, the under body based on particles of solid matter held flexibly together by means inherent in the under body and having properties of stretch and elasticity in substantial degree, the outer body being a composition applied as a plastic coating and comprising finely divided solid matter with a flexible binder which comprises elastic adhesive material having pronounced physical stability under all usual climatic temperatures.

7. A finish on building board construction and the like and over joints therein, comprising a substantially porous under body and a denser outer body in combination therewith, the said under and outer bodies jointly attaining a thickness of $\frac{1}{16}$" or more, the under body bonded to said panels at either side of and spanning a joint, the outer body covering the joint and over the under body, the under body based on particles of solid matter held flexibly together by means inherent in the under body and having properties of stretch and elasticity in substantial degree, the outer body being a composition applied as a plastic coating and comprising finely divided solid matter with a flexible binder which comprises elastic adhesive material having pronounced physical stability under all usual climatic temperatures, said under body being disposed in recesses in the boards adjacent the joint.

8. A finish on building board construction and the like and over joints therein, comprising a substantially porous under body and a denser outer body in combination therewith, the under body being of substantially greater width than the joint and being bonded to said panels at either side of and spanning a joint, the outer body covering the joint and over the under body, the under body based on particles of solid matter held flexibly together by means inherent in the under body and having properties of stretch and elasticity in substantial degree, the outer body being a composition applied as a plastic coating and comprising finely divided solid matter with a flexible binder which comprises elastic adhesive material having pronounced physical stability under all usual climatic temperatures.

9. A finish on building board construction and the like and over joints therein, comprising a substantially porous under body and a denser outer body in combination therewith, the said under and outer bodies jointly attaining a thickness of $\frac{1}{16}$" or more, the under body bonded to said panels at either side of and spanning a joint, the outer body covering the joint and over the under body, the under body based on particles of solid matter held flexibly together by means inherent in the under body and having properties of stretch and elasticity in substantial degree, the outer body being a composition applied as a plastic coating and comprising finely divided solid matter with a flexible binder which comprises elastic adhesive material having pronounced physical stability under all usual climatic temperatures, and a reinforcing element being used in connection with the finish.

10. A joint covering finish in combination with and bonded to building board construction, said finish having a structure comprising an under body which is substantially porous and substantially flexible and elastic and an outer part which is a relatively dense, flexible, strong and elastic coating comprising particles of solid material bound flexibly together with elastic adhesive material from the class of elastic varnish, said structure attaining $\frac{1}{16}$" or more in thickness at the joint and adapted to absorb movements in a joint which it covers without cracking through of the said outer part.

11. A joint covering finish in combination with and bonded to building board construction, said finish having a structure comprising an under body attaining a thickness of $\frac{1}{8}$" or more at the joint and which is substantially porous and substantially flexible and elastic and an outer part attaining a thickness of $\frac{1}{32}$" or more which is a relatively dense, flexible, strong and elastic coating comprising particles of solid material bound flexibly together with elastic adhesive material from the class of elastic varnish, said structure attaining $\frac{3}{32}$" or more in thickness at the joint and adapted to absorb movements in a joint which it covers without cracking through of said outer part.

12. A joint covering finish in combination with and bonded to building board construction, said finish having a structure comprising an under body which is substantially porous and substantially flexible and elastic and an outer part which is a relatively dense, flexible, strong and elastic coating comprising particles of solid material bound flexibly together with elastic adhesive material from the class of elastic varnish, said structure attaining $\frac{1}{16}$" or more in thickness at the joint and adapted to absorb movements in a joint which it covers without cracking through of the said outer part, said finish attaining a width at the joint of $\frac{1}{4}$" or more.

13. A joint covering finish in combination with and bonded to building board construction, said finish having a structure comprising an under body attaining a thickness of $\frac{1}{8}$" or more and a width of $\frac{1}{2}$" or more at the joint and which under body is substantially porous and substantially flexible and elastic and an outer part which is a relatively dense, flexible, strong and elastic coating comprising particles of solid material bound flexibly together with elastic adhesive material from the class of elastic varnish, said structure attaining $\frac{3}{32}$" or more in thickness at the joint and adapted to absorb movements in a joint which it covers without cracking through of the said outer part.

14. A joint covering finish in combination with and bonded to building board construction, said finish having a structure comprising an under body of a composition in which cork or the like predominates by volume and which under body is substantially porous and substantially flexible and elastic and an outer part which is a relatively dense, flexible, strong and elastic coating comprising particles of solid material bound flexibly together with elastic adhesive material from the class of elastic varnish, said structure attaining $\frac{1}{16}$" or more in thickness at the joint and adapted to absorb movements in a joint which it covers without cracking through of the said outer part.

15. A joint covering finish in combination with and bonded to building board construction, said finish having a structure comprising an under body made of a material in the class of felt and which under body is substantially porous and substantially flexible and elastic and an outer part which is a relatively dense, flexible, strong and elastic coating comprising particles of solid material bound flexibly together with elastic adhesive material from the class of elastic varnish, said structure attaining $\frac{1}{16}$" or more in thickness at the joint and adapted to absorb movements in a joint which it covers without cracking through of the said outer part.

16. A joint covering finish in combination with and bonded to building board construction, said finish having a structure comprising an under body which includes at least a preponderant amount by volume of flexible solid particles and which under body is substantially porous and substantially flexible and elastic and an outer part which is a relatively dense, flexible, strong and elastic coating comprising particles of solid material bound flexibly together with elastic adhesive material from the class of elastic varnish, said structure attaining $\tfrac{1}{16}''$ or more in thickness at the joint and adapted to absorb movements in a joint which it covers without cracking through of the said outer part.

17. A joint covering finish in combination with and bonded to building board construction together with a reinforcing member used in combination therewith, said finish having a structure comprising an under body which is substantially porous and substantially flexible and elastic and an outer part which is a relatively dense, flexible, strong and elastic coating comprising particles of solid material bound flexibly together with elastic adhesive material from the class of elastic varnish, said structure attaining $\tfrac{1}{16}''$ or more in thickness at the joint and adapted to absorb movements in a joint which it covers without cracking through of the said outer part.

18. A joint covering finish in combination with and bonded to building construction units, said finish having a structure comprising an under body which is substantially porous and substantially flexible and an outer part which is a relatively flexible plastic coating comprising particles of solid material bound together with suitable adhesive agent, said under body attaining $\tfrac{1}{16}''$ or more in thickness and $\tfrac{1}{4}''$ or more in width at the joint, said finish being adapted to absorb joint movements without cracking through of the said outer part.

19. A joint covering finish in combination with and bonded to building construction units, said finish having a structure comprising an under body which is substantially porous and substantially flexible and an outer part which covers the building construction units and which outer part is a relatively flexible plastic coating comprising particles of solid material bound together with suitable adhesive agent, said under body attaining $\tfrac{1}{16}''$ or more in thickness and $\tfrac{1}{4}''$ or more in width at the joint, said finish being adapted to absorb joint movements without cracking through of the said outer part.

20. A coating comprising the combination of an adhesive applied to a surface with a plastic coating applied on the adhesive before the adhesive is dried, the adhesive being practicably insoluble by the liquid of the plastic coating, and the adhesive being of a character to set free from plastic flow and absorption in a comparatively short time, whereby a relatively strong bond between the surface and the plastic coating is obtained.

21. A finish comprising the combination of a porous under body applied in the form of a plastic on and bonded to a structural surface and attaining $\tfrac{1}{32}''$ or more in thickness and an outer body applied as a coating over and bonded to the under body, the under body including a substantial amount of solid particles of the nature of cork and having when dry a porous structure of pronounced flexibility for absorbing strains, the outer body comprising divided solids including fibrous material and flexible binding material of the character of elastic varnish.

22. In building structure in which a plurality of panels are arranged to form a wall-like surface and over which it is desired to place a continuous surface coating, a finish comprising means for separating movably a surface coating from the edges of adjacent panels, and a surface coating over said means and panels, said surface coating comprising particles of solid material bound flexibly together with elastic material.

23. In building structure in which a plurality of panels are arranged to form a wall-like surface and over which it is desired to place a continuous surface coating, a finish comprising means for separating movably a surface coating from the edges of adjacent panels, and a surface coating over said means and panels, said surface coating comprising particles of solid material bound flexibly together with elastic material of the character of elastic varnish.

24. In building structure in which a plurality of panels are arranged to form a wall-like surface and over which it is desired to place a continuous surface coating, a finish comprising means for separating a surface coating from the edges of adjacent panels, and a surface coating over said means and panels, said surface coating comprising particles of solid material bound flexibly together with elastic material, which surface coating is adapted to remain flexible and elastic without tackiness at climatic temperatures.

25. In building structure in which a plurality of panels are arranged to form a wall-like surface and over which it is desired to place a continuous surface coating, a finish comprising means for separating a surface coating from the edges of adjacent panels, and a surface coating over said means and panels, said surface coating comprising particles of solid material bound flexibly together with elastic material, and means for increasing adhesion between the outer coating and panels along portions of said panels adjacent the outer edges of said separating means.

26. In building structure in which a plurality of panels are arranged to form a wall-like surface and over which it is desired to place a continuous surface coating, a finish comprising means for separating a surface coating from the edges of adjacent panels, and a surface coating over said means and panels, said surface coating comprising particles of solid material bound flexibly together with elastic material, said separating means being adapted, by preventing adhesion of said surface coating to said panels at the restricted areas where adjacent panels are joined, to prevent displacing forces acting upon the said panels from concentrating rupturing influences on the surface coating at the restricted areas mentioned.

27. In building structure in which a plurality of panels are arranged to form a wall-like surface and over which it is desired to place a continuous surface coating, a finish comprising means for separating movably a surface coating from the edges of adjacent panels, and a surface coating over said means and panels, said surface coating comprising particles of solid material bound flexibly together with elastic material and being of sufficient thickness and proper character to conceal said joint and separating means without leaving any telltale ridge or depression in the outside surface of said surface coating.

28. In building structure in which a plurality of panels are arranged to form a wall-like surface and over which it is desired to place a continuous surface coating, a finish comprising means for separating a surface coating from the edges of adjacent panels, and a surface coating over said means and bonded to said panels at portions removed from the immediate edges of adjacent panels, said surface coating comprising particles of solid material bound flexibly together with elastic material and attaining $\frac{1}{32}$" in thickness over the edges of adjacent panels.

29. In building structure, a finish applied to a structural surface so as to join parts either side of a break therein, the finish comprising a continuous, substantially flexible plastic coating of the character described, and means for keeping said coating in movable relation to said structural surface at said break so that displacements between said structural surface and said coating may occur without rupturing the coating, said means comprising a relatively narrow strip of material interposed between the surface and the coating.

30. In building structure in which a plurality of panels are arranged to form a wall-like surface and over which it is desired to place a continuous surface coating, a finish comprising means for separating movably a surface coating from the edges of adjacent panels, and a surface coating over said means and panels, said surface coating comprising particles of solid material including relatively long fibrous material from the class of fibrous asbestos bound flexibly together with elastic material from the class of varnish.

ANTHONY C. BENEDICT.